US008622673B2

(12) United States Patent
Wong et al.

(10) Patent No.: US 8,622,673 B2
(45) Date of Patent: Jan. 7, 2014

(54) SCREW ASSEMBLY

(75) Inventors: Pei-Hsi Wong, New Taipei (TW); Ching-Yi Shih, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/545,213

(22) Filed: Jul. 10, 2012

(65) Prior Publication Data

US 2013/0108393 A1 May 2, 2013

(30) Foreign Application Priority Data

Oct. 31, 2011 (TW) ............................ 100139558 A

(51) Int. Cl.
*F16B 21/18* (2006.01)

(52) U.S. Cl.
USPC .......................................... 411/353; 411/347

(58) Field of Classification Search
USPC ......... 411/166, 337, 347, 349, 353, 356, 357, 411/517, 520–521, 552, 941.1, 946
See application file for complete search history.

(56) References Cited

U.S. PATENT DOCUMENTS

| | | | | |
|---|---|---|---|---|
| 2,235,530 | A * | 3/1941 | Mercer | 411/347 |
| 2,497,550 | A * | 2/1950 | Jeffries | 403/274 |
| 3,059,736 | A * | 10/1962 | Boyd | 403/7 |
| 3,263,728 | A * | 8/1966 | Lynch | 411/349 |
| 3,437,119 | A * | 4/1969 | Dey | 411/349 |
| 3,934,315 | A * | 1/1976 | Millheiser et al. | 24/453 |
| 5,042,880 | A * | 8/1991 | Garuti et al. | 301/35.624 |
| 6,468,011 | B2 * | 10/2002 | Mayer | 411/353 |
| 6,682,282 | B2 * | 1/2004 | Allen | 411/353 |
| 6,859,368 | B2 * | 2/2005 | Yang | 361/704 |
| 7,641,431 | B2 * | 1/2010 | Luo et al. | 411/353 |
| 2011/0255935 | A1 * | 10/2011 | Chen et al. | 411/347 |

* cited by examiner

*Primary Examiner* — Roberta Delisle
(74) *Attorney, Agent, or Firm* — Altis Law Group, Inc.

(57) ABSTRACT

A screw assembly includes a screw, a spring, and a mounting panel. The screw comprises a head portion and a shaft portion extending from the head portion. The spring comprises a spring body and a securing end extending from the spring body. The spring body defines a surrounding opening. The mounting panel defines a through hole corresponding to the surrounding opening. The mounting panel comprises a positioning portion. The shaft portion is located in the surrounding opening and the through hole. The spring is located between the head portion and the mounting panel. The positioning portion is configured to resist the securing end to prevent the spring from rotating.

20 Claims, 7 Drawing Sheets

111 113 115 11 1311 131 13 133 15 151 153 155 17 171 2311 23 2333 233 2331 231 25 255 2551 251 253 17

SCREW ASSEMBLY

BACKGROUND

1. Technical Field

The present disclosure relates to screw assemblies, and more particularly to a screw assembly with a spring.

2. Description of Related Art

Typically, screws are screwed in securing holes to secure an object to another object. There may be a spring surrounding the screw. However, the spring may rotates with the screw when the screw is screwed into the securing hole.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
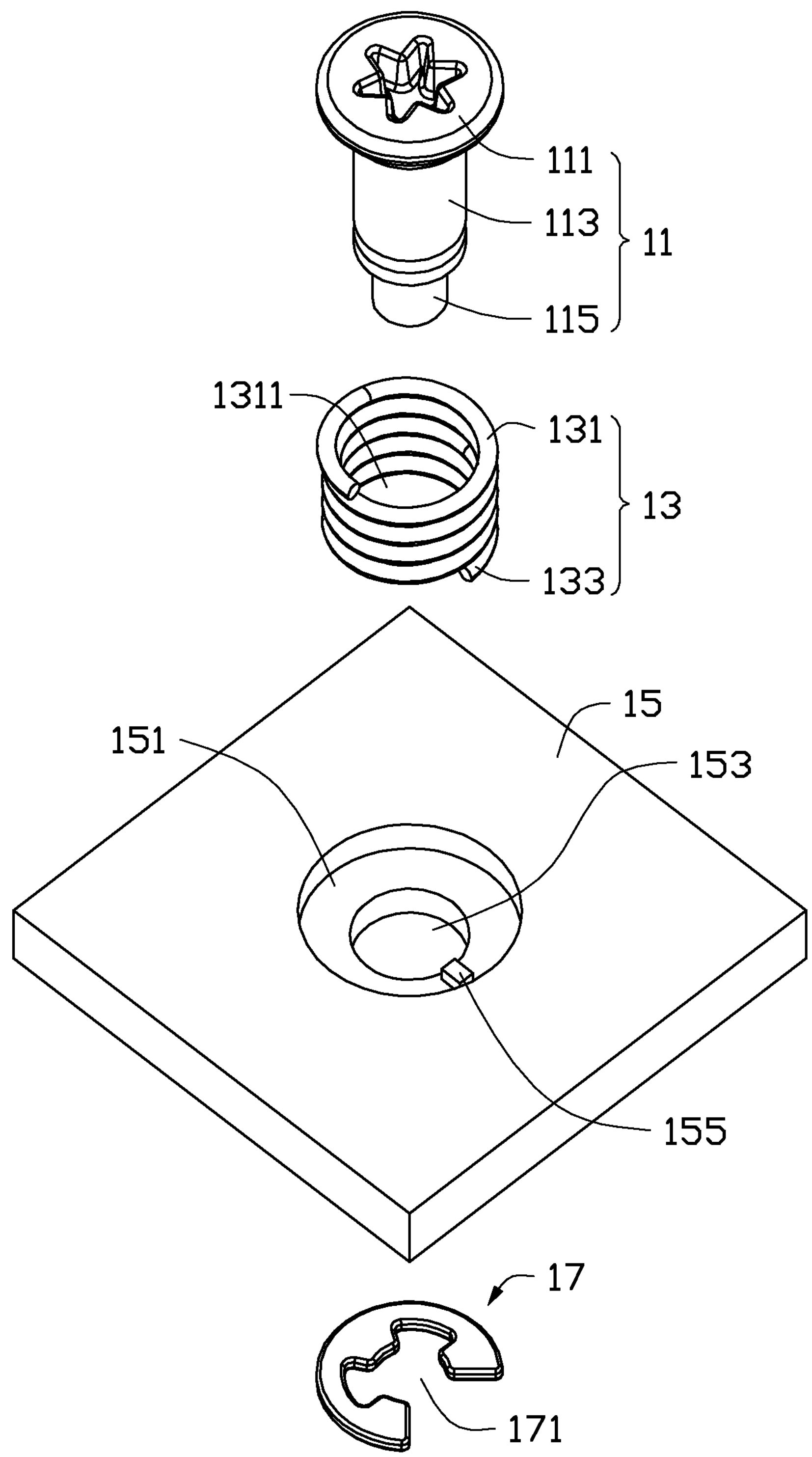
FIG. 1 is an isometric, exploded view of first embodiment of a screw assembly.
Figure 2:
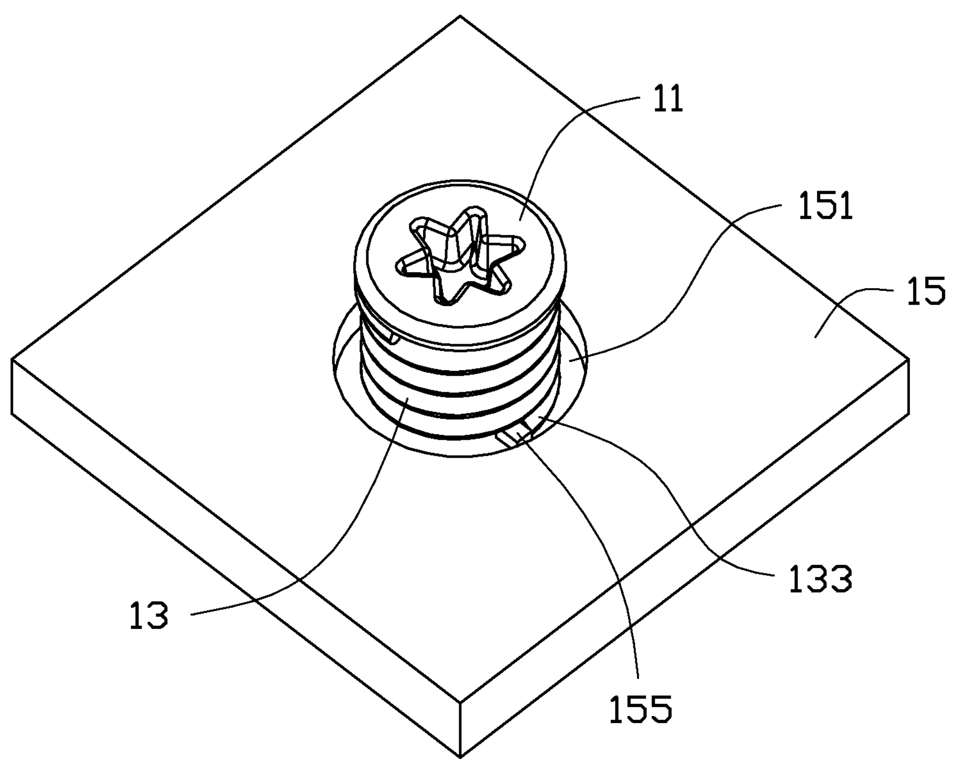
FIG. 2 is an assembled view of FIG. 1.

FIGS. 1 and 2, shows a screw assembly according to one embodiment. The screw assembly includes a screw 11, a spring 13, a mounting panel 15, and a securing member 17.

The screw 11 includes a head portion 111, a shaft portion 113 extending from the head portion 111, and a securing portion 115 extending from the shaft portion 113. A cross section of the head portion 111 is greater than a cross section of the shaft portion 113. The shaft portion 113 defines a slot 117 (shown in FIG. 3) adjacent to the securing portion 115.

The spring 13 includes a spring body 131 and a securing end 133 extending from the spring body 131. The spring body 131 defines a surrounding opening 1311. The spring 13 may be a coil spring.

The mounting panel 15 defines a recess portion 151. The recess portion 151 defines a through hole 153 corresponding to the surrounding opening 1311. The mounting panel 15 includes a positioning portion 155 extending from the recess portion 151. The positioning portion 155 is used for resisting the securing end 133 of the spring 13. The securing member 17 defines an engaging cutout 171 corresponding to the slot 117.

Figure 3:
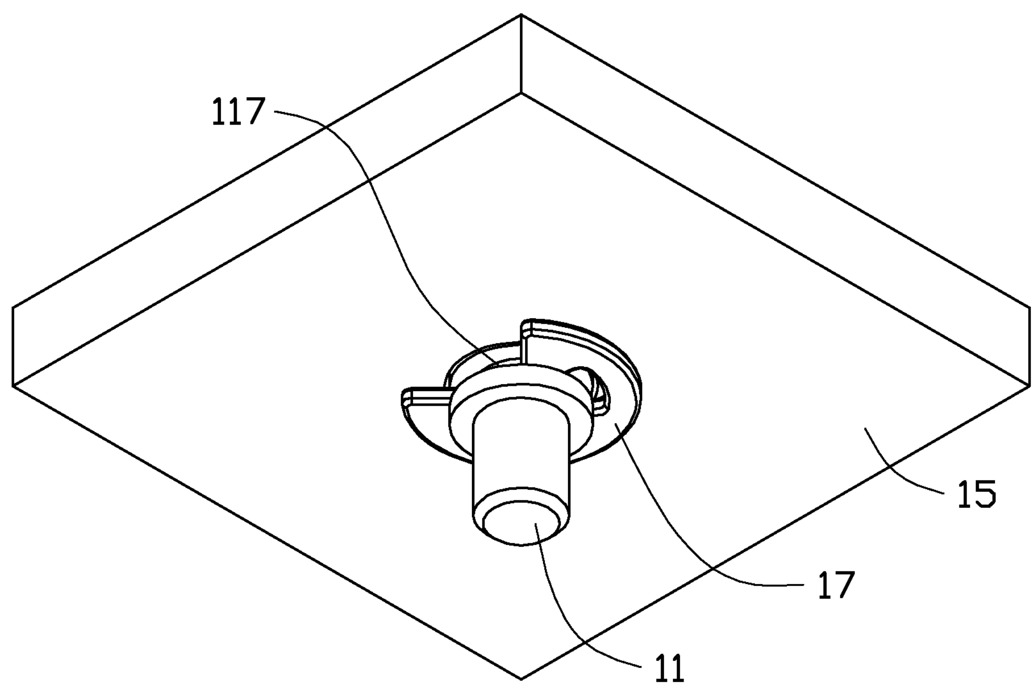
FIG. 3 is an assembled view of FIG. 1, but viewed from another aspect.

Referring to FIGS. 2 and 3, the spring 13 is placed in the recess portion 151 to enable the securing end 133 to contact the positioning portion 155. The shaft portion 113 of the screw 11 extends through the surrounding opening 1311 of the spring 13 and the through hole 153 of the recess portion 151. The engaging cutout 171 of the securing member 17 engages in the slot 117 of the shaft portion 113, thereby securing the screw 11 to the mounting panel 15.

Figure 4:
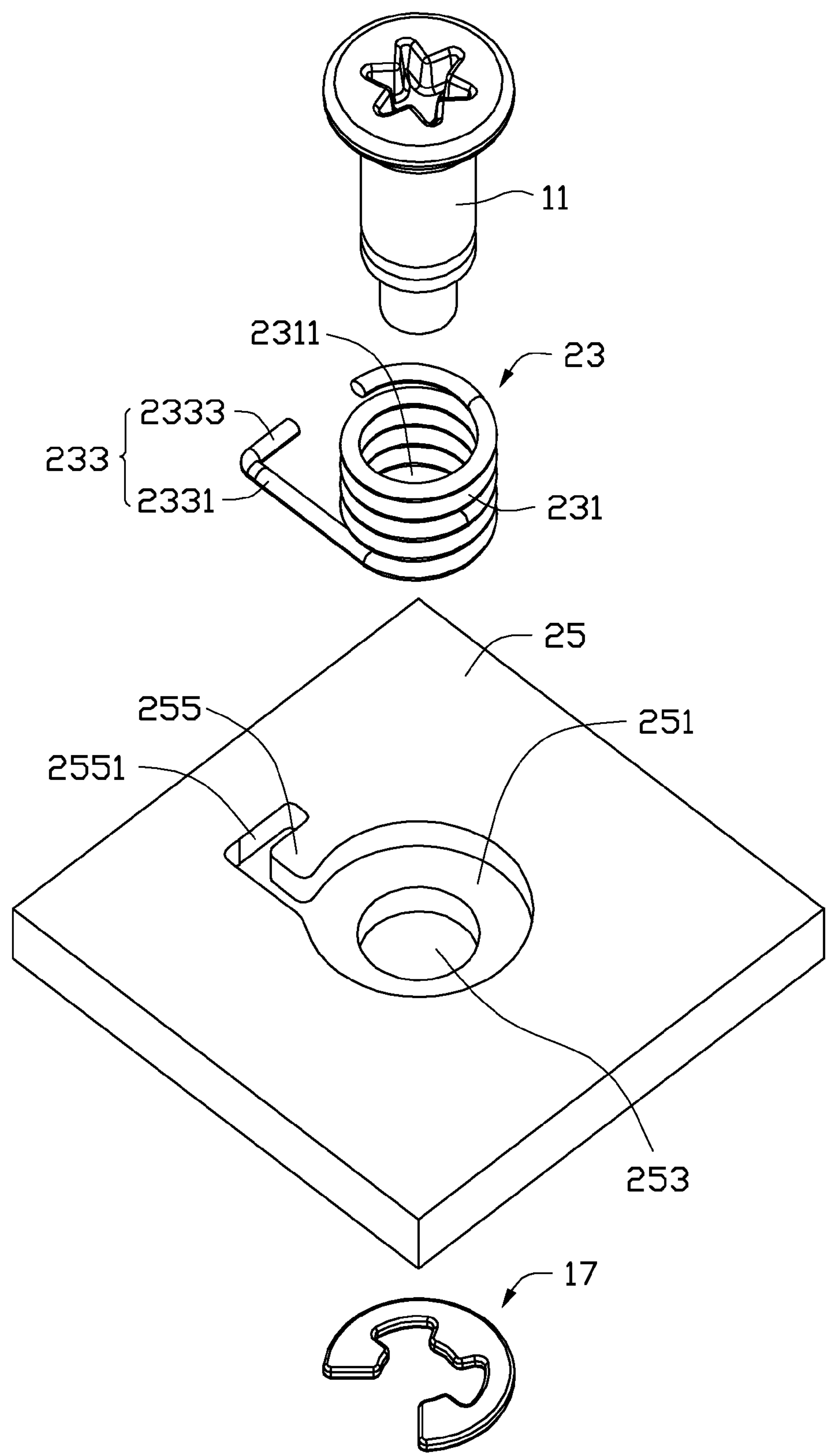
FIG. 4 is an isometric, exploded view of a second embodiment of a screw assembly.

FIG. 4 is a screw assembly of one embodiment. The screw assembly includes the screw 11, a spring 23, a mounting panel 25, and the securing member 17.

The spring 23 includes a spring body 231 and a securing end 233 extending from the spring body 231. The spring body 231 defines a surrounding opening 2311. The securing end 233 is L-shaped. The securing end 233 includes a connecting part 2331, connected to the spring body 231, and a securing part 2333, extending from the connecting part 2331.

The mounting panel 25 defines a recess portion 251. The recess portion 251 defines a through hole 253 corresponding to the surrounding opening 2311. The mounting panel 25 includes a positioning portion 255 extending from the recess portion 251. The positioning portion 255 defines an L-shaped positioning slot 2551. The positioning slot 2551 is used for receiving the securing end 233 of the spring 23.

Figure 5:
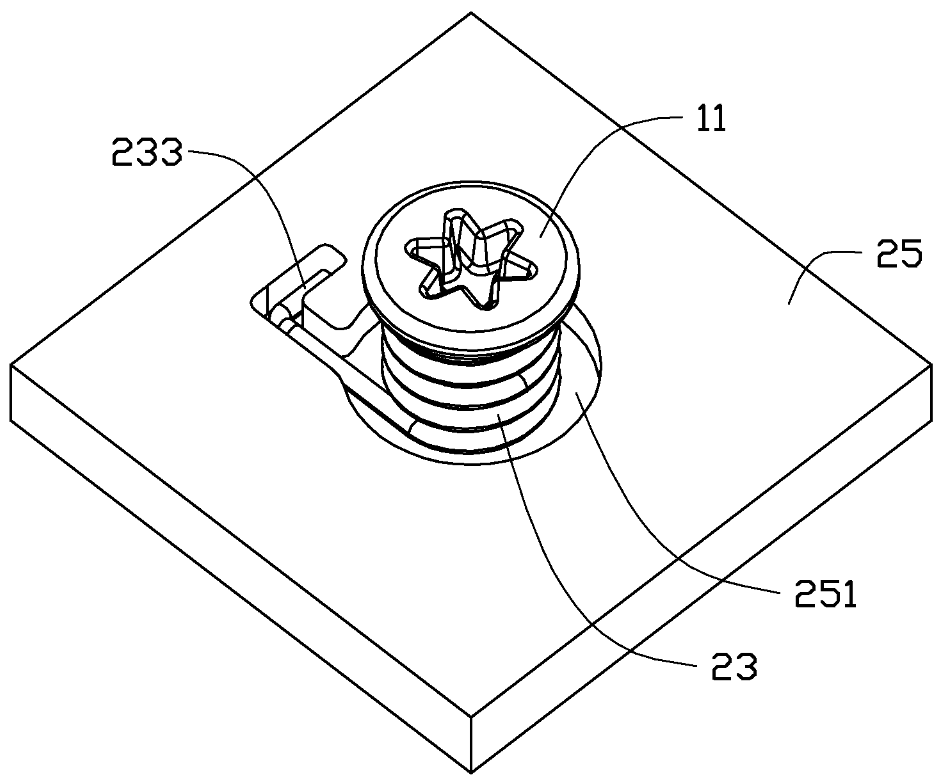
FIG. 5 is an assembled view of FIG. 4.

Referring FIGS. 1, 4, and 5, in assembly, the spring 23 is placed in the recess portion 251, to enable the securing end 233 to be received in the positioning slot 2551 of the positioning portion 255. The shaft portion 113 of the screw 11 extends through the surrounding opening 2311 of the spring 23 and the through hole 253 of the recess portion 251. The engaging cutout 171 of the securing member 17 is engaged in the slot 117 of the shaft portion 113, thereby securing the screw 11 to the mounting panel 25.

Figure 6:
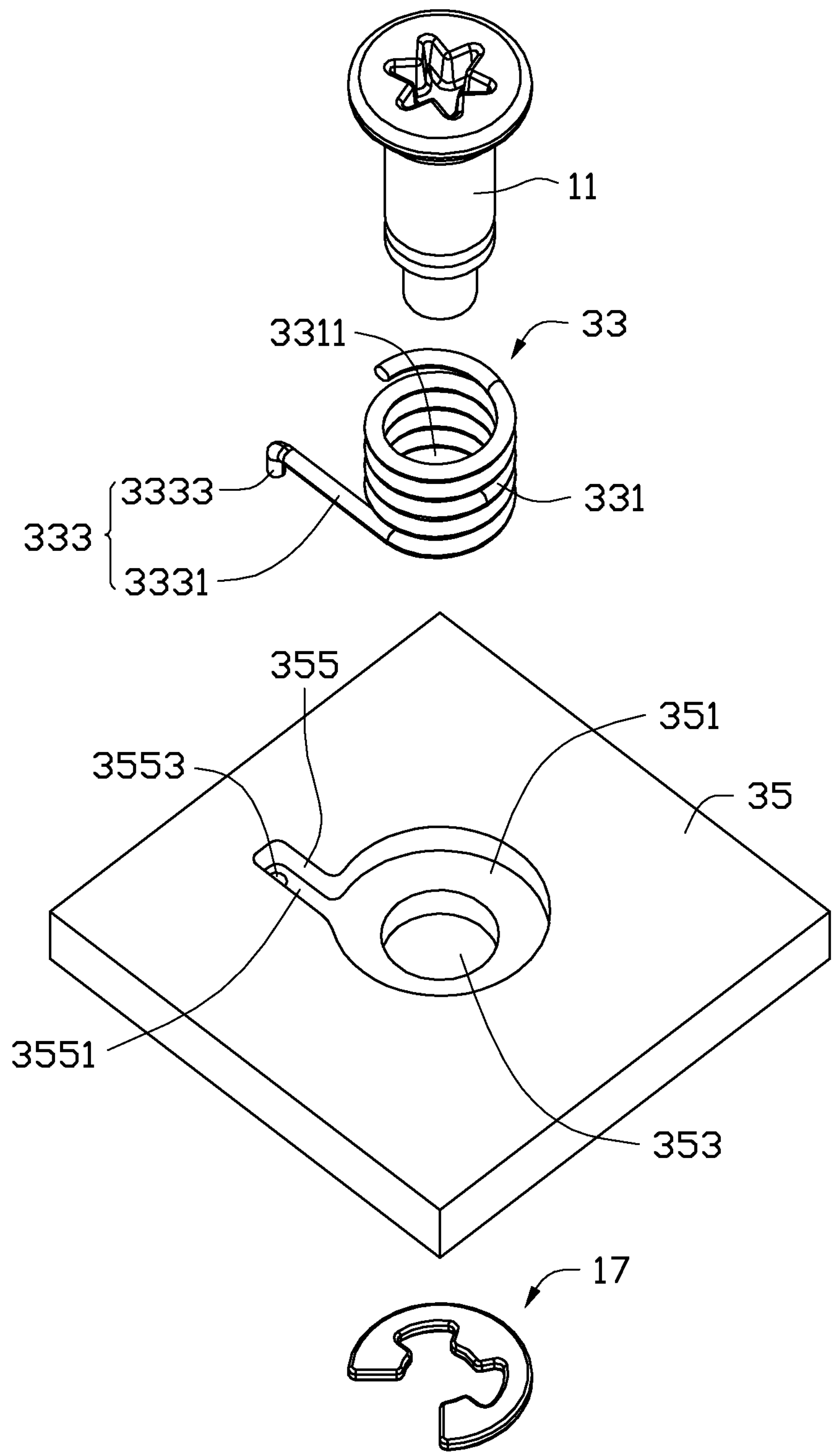
FIG. 6 is an isometric, exploded view of a third embodiment of a screw assembly.

Referring to FIG. 6, a screw assembly of one embodiment is shown. The screw assembly includes the screw 11, a spring 33, a mounting panel 35, and the securing member 17.

The spring 33 includes a spring body 331 and a securing end 333 extending from the spring body 331. The spring body 331 defines a surrounding opening 3311. The securing end 333 is L-shaped. The securing end 233 includes a connecting part 3331, connected to the spring body 331, and a securing part 3333, extending from the connecting part 3331.

The mounting panel 35 defines a recess portion 351. The recess portion 351 defines a through hole 353 corresponding to the surrounding opening 3311. The mounting panel 35 includes a positioning portion 355 extending from the recess portion 251. The positioning portion 355 defines a positioning slot 3551. The positioning portion 3555 defines a positioning hole 3553 communicating with the positioning slot 3551. The extending direction of the positioning hole 3553 is substantially perpendicular to the mounting panel 35. The positioning slot 3551 is used for receiving the connecting part 3331. The securing part 3333 of the securing end 333 is used for being inserted in the positioning hole 3553.

Figure 7:
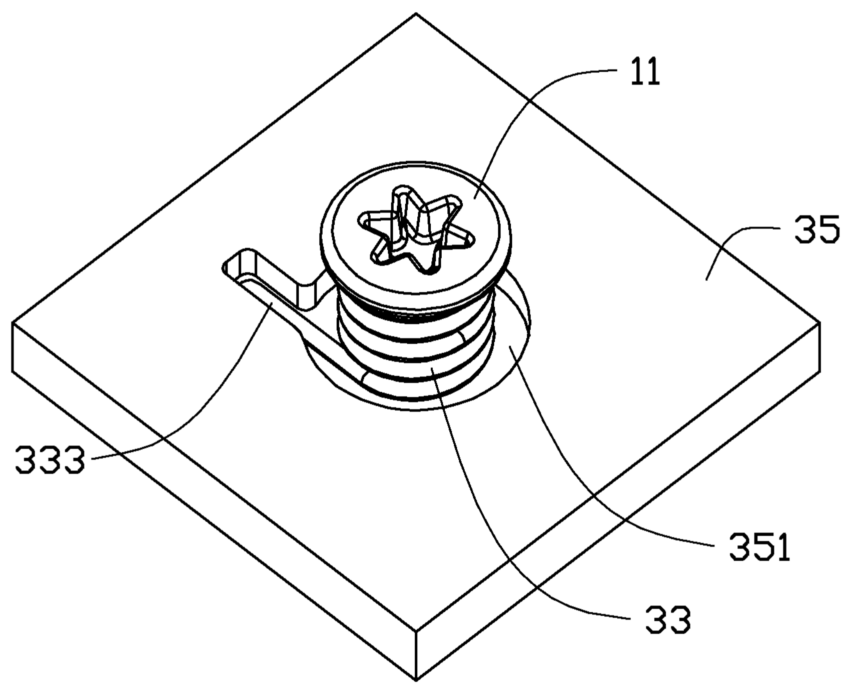
FIG. 7 is an assembled view of FIG. 6.

Referring FIGS. 1, 6, and 7, in assembly, the spring 33 is placed in the recess portion 351 to enable the connecting part 3331 of the securing end 333 to be received in the positioning slot 3551 and enable the securing part 3333 to be received in the positioning hole 3553. The shaft portion 113 of the screw 11 extends through the surrounding opening 3311 of the spring 33 and the through hole 353 of the recess portion 351. The engaging cutout 171 of the securing member 17 engages in the slot 117 of the shaft portion 113, thereby securing the screw 11 to the mounting panel 35.

In the above embodiments, the securing end of the spring resists the positioning portion of the mounting panel when the screw 11 is rotated to be screwed into a screw hole. Thereby the securing portion 115 of the screw 11 is easily screwed into the screw hole.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A screw assembly, comprising:

a screw, the screw comprises a head portion and a shaft portion extending from the head portion;

a spring, the spring comprises a spring body and a securing end extending from the spring body; the spring body defines a surrounding opening; and a mounting panel, the mounting panel defines a through hole corresponding to the surrounding opening, the mounting panel comprises a positioning portion;

wherein the shaft portion is located in the surrounding opening and the through hole; the spring is located between the head portion and the mounting panel; and the positioning portion resists the securing end to prevent the spring from rotating.

2. The screw assembly of claim 1, wherein the positioning portion defines positioning slot receiving the securing end.

3. The screw assembly of claim 2, wherein the securing end is L-shaped, and the securing end comprises a connecting part connected to the spring body and a securing part connected to the connecting part.

4. The screw assembly of claim 3, wherein the positioning portion defines a positioning hole communicating with the positioning slot, and the securing part is received in the positioning hole.

5. The screw assembly of claim 4, wherein an extending direction of the positioning hole is substantially perpendicular to the mounting panel.

6. The screw assembly of claim 3, wherein the positioning slot is L-shaped.

7. The screw assembly of claim 1, wherein the mounting panel comprises a recess portion; the through hole is defined in the recess portion; and the spring body is located in the recess portion.

8. The screw assembly of claim 7, wherein the positioning portion is located in the recess portion.

9. The screw assembly of claim 1, further comprising a securing member, wherein the shaft portion defines a slot, and the securing member is engaged in the slot to prevent the shaft portion to move out of the through hole.

10. The screw assembly of claim 9, wherein the securing member defines an engaging cutout, the engaging cutout engages in the slot.

11. A screw assembly, comprising:

a screw;

a spring, the spring comprises a spring body and a securing end extending from the spring body; the spring body defines a surrounding opening; and a mounting panel, the mounting panel defines a through hole corresponding to the surrounding opening, the mounting panel comprises a positioning portion;

wherein the screw is located in the surrounding opening and the through hole; and the positioning portion resists the securing end to prevent the spring from rotating in a rotation direction substantially parallel to the mounting panel with the screw, thereby enabling the screw to move in a direction substantially perpendicular to the mounting panel.

12. The screw assembly of claim 11, wherein the positioning portion defines positioning slot receiving the securing end.

13. The screw assembly of claim 12, wherein the securing end is L-shaped, and the securing end comprises a connecting part connected to the spring body and a securing part connected to the connecting part.

14. The screw assembly of claim 13, wherein the positioning portion defines a positioning hole communicating with the positioning slot, and the securing part is received in the positioning hole.

15. The screw assembly of claim 14, wherein an extending direction of the positioning hole is substantially perpendicular to the mounting panel.

16. The screw assembly of claim 13, wherein the positioning slot is L-shaped.

17. The screw assembly of claim 11, wherein the mounting panel comprises a recess portion; the through hole is defined in the recess portion; and the spring body is located on the recess portion.

18. The screw assembly of claim 17, wherein the positioning portion is located in the recess portion.

19. The screw assembly of claim 11, further comprising a securing member, wherein the screw comprises a head portion and a shaft portion extending from the head portion; the shaft portion is located in the surrounding opening and the through hole; the shaft portion defines a slot, and the securing member engages in the slot to prevent the shaft portion to move out of the through hole.

20. The screw assembly of claim 19, wherein the securing member defines an engaging cutout, and the engaging cutout is engaged in the slot.

* * * * *